United States Patent
Muhr et al.

(10) Patent No.: US 9,938,600 B2
(45) Date of Patent: Apr. 10, 2018

(54) MANUFACTURING A HARDENED FORMED PART

(71) Applicant: Muhr und Bender KG, Attendorn (DE)

(72) Inventors: Thomas Muhr, Attendorn (DE); Jorg Dieter Brecht, Olpe (DE); Christoph Schneider, Lennestadt-Elspe (DE); Philip Beiter, Bergisch-Gladbach (DE)

(73) Assignee: Muhr und Bender KG, Attendorn (DE)

( * ) Notice: Subject to any disclaimer, the term of this patent is extended or adjusted under 35 U.S.C. 154(b) by 398 days.

(21) Appl. No.: 14/719,532

(22) Filed: May 22, 2015

(65) Prior Publication Data

US 2015/0337406 A1 Nov. 26, 2015

(30) Foreign Application Priority Data

May 26, 2014 (DE) .................. 10 2014 210 008

(51) Int. Cl.

| | |
|---|---|
| *C21D 8/02* | (2006.01) |
| *C21D 9/52* | (2006.01) |
| *C21D 9/54* | (2006.01) |
| *C23C 2/02* | (2006.01) |
| *C25D 5/34* | (2006.01) |
| *B32B 15/01* | (2006.01) |
| *C25D 17/00* | (2006.01) |
| *C25D 5/02* | (2006.01) |
| *C25D 5/16* | (2006.01) |
| *C25D 5/18* | (2006.01) |

(Continued)

(52) U.S. Cl.
CPC ............ *C21D 8/0278* (2013.01); *B32B 15/01* (2013.01); *C21D 8/02* (2013.01); *C21D 9/52* (2013.01); *C21D 9/54* (2013.01); *C23C 2/02* (2013.01); *C25D 5/026* (2013.01); *C25D 5/16* (2013.01); *C25D 5/18* (2013.01); *C25D 5/34* (2013.01); *C25D 5/36* (2013.01); *C25D 17/00* (2013.01); *C25D 17/007* (2013.01); *C25D 17/008* (2013.01); *C25D 17/12* (2013.01)

(58) Field of Classification Search
CPC .......... C21D 8/0278; C21D 9/52; C21D 9/54; C21D 8/02
See application file for complete search history.

(56) References Cited

U.S. PATENT DOCUMENTS

2007/0256808 A1* 11/2007 Fleischanderl ........ C21D 1/673
164/72

FOREIGN PATENT DOCUMENTS

| CA | 2879540 A1 | 2/2014 |
|---|---|---|
| DE | 957614 B | 2/1957 |
| DE | 1771953 C3 | 4/1978 |

(Continued)

*Primary Examiner* — Jessee Roe
(74) *Attorney, Agent, or Firm* — Bejin Bieneman PLC (57) ABSTRACT

A hardened formed part is manufactured with the steps: producing a blank from a hardenable strip material; heating of the blank to an austenitization temperature; forming and hardening of the blank to a hardened formed part; cleaning the hardened formed part; coating the hardened formed part with a metallic coating in an dipping bath with an electrolyte solution, wherein during the coating process, at least one auxiliary element is used in the dipping bath, such, that the deposition of the coating is partially influenced. A plant is used for manufacturing a hardened formed part.

14 Claims, 5 Drawing Sheets

(51) Int. Cl.
    *C25D 5/36*         (2006.01)
    *C25D 17/12*       (2006.01)

(56)           References Cited

FOREIGN PATENT DOCUMENTS

| | | |
|---|---|---|
| DE | 19717510 C1 | 10/1998 |
| DE | 10 2004 037 206 A1 | 3/2006 |
| DE | 102012110972 B3 | 3/2014 |
| DE | 102013010025 A1 | 12/2014 |
| EP | 2327805 A1 | 6/2011 |
| EP | 2412848 A1 | 2/2012 |
| GB | 761466 A | 11/1956 |
| WO | 9107527 A1 | 5/1991 |

* cited by examiner

MANUFACTURING A HARDENED FORMED PART

CROSS-REFERENCE TO RELATED APPLICATIONS

This application claims the benefit of priority from German Patent Application No. DE 10 2014 210 008.9, filed May 26, 2014. The entire contents of the said fore-going German application are hereby incorporated herein by reference in their entirety.

Disclosed herein is a method and a plant for manufacturing hardened and coated formed parts from a rolled strip material. The coating shall protect the formed part against corrosion. The present disclosure further relates to such a formed part as a structural component with a corrosion protection system, especially as a car body component for a motor vehicle.

From DE 10 2004 037 206 A1 a car body is known for a motor vehicle, which is assembled from individual elements. Individual elements are used for the car body that are made from flexible rolled sheets with a variable sheet thickness. Such sheet metal elements with variable sheet thickness are also designated as Tailor Rolled Blanks (TRB).

Current developments in the motor vehicle industry towards light-weight design and passenger protection lead to an increased use of high strength or super high strength car body steels. Multi-phase steels or martensite-phase steels are especially used. The latter steels are generally processed via an indirect or direct hot forming method to structural components.

Structural components for motor vehicles are commonly provided with a coating that should protect the metal sheet against corrosion. However, the execution of a reliable corrosion protection is particularly difficult with regard to hot-formed steel materials. Several coatings and coating methods are known, which differ from each other among other things in whether the coating is applied before or after the hot forming process.

A known method for coating steel components is for example the galvanic (electrolytic) zinc coating. During the galvanic zinc coating the work pieces are dipped into a zinc electrolyte. Coatings made from zinc act, because of their less noble character compared to the work piece, as a "sacrificial anode". The galvanised base material serves as cathode, because of which this type of coating is also characterised as cathodic corrosion protection.

From EP 2 412 848 A1 a method is known for manufacturing a sheet metal formed part provided with a corrosion protection coating. Initially a sheet metal material is formed and hardened to a sheet metal formed part. Then a zinc-nickel-coating is applied onto the hardened sheet metal formed part as a corrosion protection coating. At the beginning of the coating process a thin nickel layer is deposited, which generally prevents a hydrogen embrittlement of the steel sheet material.

A difficulty with regard to the process of coating materials for super high strength structural components used in large series manufacturing is that the corrosion protection of coatings applied before the hot forming can change the characteristics of the component and of the coating disadvantageously by the temperature that acts upon the coating system before and after the hot forming. This can lead to solder cracking and micro-cracks in the coating or in the coated component, which has a negative influence on the coated component and its corrosion behaviour. Coating systems and methods such as flame spraying and sheradising, which are applied after the hot forming, have the disadvantage that the layer thickness has large fluctuations and the methods are as a whole cumbersome.

From the publication "Hochgeschwinkeitsverzinken (HGV) geometrisch komplexer Bauteile" (High-velocity galvanising (HGV) of geometrically complex components) of the Department for Mechanical Engineering of the University of Stuttgart, by Christoph Janisch, it is known, that the current density during the electrolytic coating can be locally increased by additionally attached anodes.

Proposed herein is a method for manufacturing a hardened formed part that offers an especially good corrosion protection. Further proposed is a corresponding plant for manufacturing a hardened formed part with good corrosion protection characteristics as well as a correspondingly manufactured component.

A solution is a method for manufacturing a hardened formed part with the steps: producing a blank from a hardenable strip material; heating the blank to an austenitisation temperature; forming and hardening the blank to a hardened formed part; cleaning the hardened formed part; coating the hardened formed part with a metallic coating in a dipping bath with an electrolyte solution, wherein during coating at least one auxiliary element is provided in the dipping bath, such that the deposition of the coating is partially influenced.

An advantage is that the coating is not subjected to unwanted influences caused by the forming or hardening processes because the coating process is carried out only after the forming and hardening. A substantially constant distribution and layer thickness can be produced on the surface of the formed part, which is especially free of cracks. The forming process has no negative mechanical or thermal effect on the coating, as can be the case when the blank or the strip material is coated before being formed. The deposition of a substantially evenly distributed coating is additionally supported in that at least one auxiliary element is provided in the dipping bath, with which the build-up of the layer on the surface of the formed part is partially influenced. Altogether, the quality of the coating on the formed part and thus the corrosion resistance of the formed part is distinctly increased. At least one auxiliary element means that one or more auxiliary elements can be provided, each of which can be configured and designed individually according to their characteristics influencing the coating process. Especially when using several auxiliary elements, these can have features differing from each other, like shape or electric conductivity. Insofar, as in the present disclosure it is referred to one or the auxiliary element is named, this should be understood in the sense of at least one auxiliary element.

According to a preferred embodiment the coating process is carried out such that an average layer thickness of at least 3 µm (micrometers), especially at least 7 µm, is applied on the hardened formed part. Thus, a good corrosion protection of the formed part is ensured. An upper limit for the layer thickness can be for example a maximum of 30 µm, especially a maximum of 15 µm, so that the coating process can be carried out relative quickly. It is understood that the named upper and lower limits are arbitrarily combinable and that any value in between can be used, respectively, and that also other layer thicknesses can generally be taken into account. The layer thickness can be individually adjusted or influenced in partial portions by the auxiliary elements. For example, it is possible, that by corresponding arrangement of the auxiliary elements a larger layer thickness can be achieved in partial areas in a targeted manner than in other partial areas. Furthermore, the process can be set so as to produce a preferably constant layer thickness across the whole surface of the component.

The coating is applied galvanically, i. e. electrolytically. For this anodes for example made from pure zinc or from zinc and other alloying elements can be used, which, when a current is applied, transfer metal ions to the electrolytes. Alternatively, also form-stable anodes can be used; in this case the coating material is already dissolved in the electrolyte. The zinc ions and if necessary ions of further alloying elements are deposited on the formed part as atoms and form the coating, with the formed part acting as a cathode.

The coating material has preferably an amount of at least 50 mass percent of zinc, preferably at least 90 mass percent of zinc, wherein the zinc content can also be 100 percent (pure zinc coating). The duration of the coating process is preferably less than or equal to 20 minutes, especially less than or equal to 15 minutes, more particularly less than or equal to 10 minutes long. During the coating process, a relative flow is generated between the hardened formed part and the electrolyte solution according to an advantageous embodiment. A relative flow on the surface of the formed part advantageously inhibits an unwanted formation of hydrogen in the electrolyte solution, so that thus the hydrogen transfer into the formed part is kept low. If the hydrogen inclusion during the coating process is below specific upper limits, a following heat treatment like an effusion annealing can be omitted.

At least one of the auxiliary elements can include an electrically conductive material so as to be electrically conductive, to which an electric current is applied relative to the hardened formed part during the coating process. When using several electrically conductive auxiliary elements, these can be loaded with different electric potentials during the coating process. Thus, the layer thickness to be produced on the formed part can be partially individually adjusted. For example, the layer structure in partial areas of the formed part, in, which because of the geometric conditions or other boundary conditions, the building of the layer structure would take place generally at a slower velocity, can be accelerated by an increased electric current. Additionally or alternatively, at least one of the auxiliary elements can be provided from an electrically conductive material, which is connected to the component to be coated by an electric conductor.

According to a possible embodiment the coating process can be carried out such that at least in one process step the formed part to be coated is subjected to a pulsed current. Alternatively or additionally, the formed part can also be subjected to a non-pulsed current. During the treatment with a pulsed or non-pulsed current, the sequence is variable, i.e., the formed part can, in a first step, be treated with a pulsed current and in a following second step with a non-pulsed current, or vice versa, first with a non-pulsed and then with a pulsed current. By applying a pulsed application in a first partial step, a nano-crystalline layer structure is achieved, which for example can have a layer thickness of one up to two micro-meters. The coating has, therefore, close to the work piece an especially dense structure, which acts as a diffusion barrier layer. The treatment of the electrolyte solution with a pulsed current can take place in a first station; in a following second station, the electrolyte solution can be loaded with a non-pulsed current. The application of an electric current can be effected by separate anodes and/or by an electrically conductive auxiliary element.

Alternatively or in addition to using an auxiliary element made from an electric conductive material, at least one of the auxiliary elements can include an electrically non-conductive material so as to be electrically non-conductive. For the coating process, such a non-conductive auxiliary element is arranged in the dipping bath especially such that the deposition of the coating is partially inhibited. The non-conductive auxiliary element acts insofar as a masking and can locally inhibit the coating process.

Independent of the design of the auxiliary elements, it is provided, according to a preferred embodiment, that at least one of the auxiliary elements is accommodated in a holding device, wherein the holding device is movable within the dipping bath. It can especially be provided that after dipping the hardened formed part into the dipping bath, the auxiliary element is moved relative to the formed part from a resting position, in which the auxiliary element is distanced from the formed part, into a treatment position, in which the auxiliary element is moved closer to the formed part. Because of the movability of the respective auxiliary element relative to the formed part, the auxiliary element can be positioned very accurately for the coating process and thus can locally influence, for example facilitate or inhibit, the layer formation, and/or the coating deposition. Furthermore, it can be provided, that the holding device of the auxiliary elements remains in the immersion bath, in which it is movably arranged.

The coating process is carried out by dipping the work piece into the dipping bath with an electrolyte solution. The dipping bath can also be referred to as immersion bath or electrolytic bath. According to a first possibility, the coating process can be carried out in a continuous manner, wherein the work piece is coated while being continuously moved through the dipping bath. Because of the relative flow on the work piece surface, a good reproducibility of the coating process is achieved, as well as a particularly uniform coating over the entire surface. It is understood, that the continuous method may also include temporal pauses in which the advance can be stopped shortly for some extent as for example in chain delivery systems. Alternatively the coating process can also be carried out in a discontinued process, wherein the work pieces are dipped into the dipping bath and after finishing the coating process are again lifted out. Furthermore, the discontinued process can comprise in an advantageous manner the production of a relative flow, for example by nozzles generating a fluid flow against the formed part.

Performing the coating process with use of a relative flow ensures in an advantageous manner that the zinc content is kept high on the work piece surface due to the forth-flowing electrolytes. An unwanted production of hydrogen in the electrolyte and a corresponding inclusion of hydrogen in the work piece is thus inhibited during the coating process. A hydrogen embrittlement of the work piece is prevented, so that a following heat treatment can be omitted.

An acidic electrolyte solution is preferably used as electrolyte solution, which can have a pH-value of especially 2 to 4. However, alternatively an alkaline electrolyte can be used with a pH-value of preferably larger than 7. An acidic electrolyte has the advantage that it can be subjected to a high electric current density, i.e. at a predetermined time the deposited coating thickness is relative large, and that a hydrogen inclusion in the component is relative low. However, it is disadvantageous that an acidic electrolyte has a worse scattering power. Contrary thereto is that, in alkaline electrolytes, the deposition is more homogeneous, i.e., the electrolyte has a better throwing power so that an especially uniform coating build-up is achieved on the work piece.

In the following method steps carried out before the coating process are described in more detail.

Starting point can be at least one strip material made from a hardenable steel material. Preferably, a manganese containing material is used as hardenable steel material, which can additionally contain further micro alloying elements, such as, for example, niobium and/or titanium. In this case, the percent by weight of this micro alloying elements of the total mass is preferably maximally 1000 ppm (parts per million). Further micro alloying elements can be added in low percent by weight, such as boron and/or vanadium. Examples for a usable steel material are 22MnB5, 34MnB5 or also 51CrV4. The starting material (strip material) has a tensile strength of preferably at least 450 MPa and/or preferably a maximum of 850 MPa. The finished formed part can have a final tensile strength of at least 1100 MPa, preferably at least 1300 MPa, especially preferably even above 1500 MPa at least in partial areas.

From the at least one strip material, blanks are produced, which according to an embodiment can be produced such that they have portions with different thicknesses. The portions with different thicknesses can be achieved according to a first process by flexible rolling of the strip material and following cutting of the blank from the flexible rolled strip material. The so manufactured blanks are also called Tailor Rolled Blanks. According to an alternative second process, which is combinable with the first one, the blanks can be manufactured by connecting several partial blanks to each other, which have different thicknesses. The partial blanks can be produced correspondingly from several strip materials having metal sheet thicknesses differing from one another. The connecting of the individual partial blanks can be carried out by welding, for example. A blank made from several partial blanks is called a Tailor Welded Blank. Because of the differing thicknesses, the components made from such blanks can be adapted in an advantageous manner partially to technical requirements like specific loadings. However, it is to be understood that the method can also be used for blanks with same metal sheet thicknesses.

Flexible rolling means a rolling process in which a steel strip with a constant thickness is rolled along the length to a strip material with variable thickness along the length. The starting thickness before the flexible rolling can be up to 8 mm (millimeters). As a strip material for the flexible rolling, a hot strip or a cold strip can be used, wherein these terms shall be understood in the sense of common technical terminology. A steel strip can also be referred to as steel band. A hot strip is a rolling steel product (steel strip or band), which is produced by rolling after previous heating. A cold strip is a cold-rolled steel strip (flat steel), in which the final thickness reduction is achieved by rolling without previous heating. After the flexible rolling, the strip material can have, for example, a thickness of at most 6.0 mm at the thickest point. Preferably, the flexible rolling is carried out such that at least two portions with different thickness are produced, wherein the ratio of a first thickness of a thinner first portion to a second thickness of a second portion is smaller than 0.8, especially less than 0.7, preferably smaller than 0.6. However, it is understood that, depending on the requirements of the finished product, in principle any number of portions with different thickness can be produced. The thickness can be especially adjusted along the length such that the loadings of the component are at least essentially constant, or that loading peaks are prevented or at least reduced.

Concerning terminology, the cutting of the blanks from the strip material, which can also be described as separating, is supposed to comprise any type of producing blanks or contoured sheet metal parts from the strip material. This can be achieved for example by mechanical cutting, like punching or cutting or by laser cutting. Blanks refer to sheet metal parts that are cut from the strip material and can have a rectangular shape, for example. Contoured sheet metal parts refer to sheet metal elements cut from the strip material and which outer profile, i. e., contour, is already adapted to the shape of the final product. When producing blanks or contoured sheet metal parts, an edge can remain on the strip material, which is not further used. However, also a simple cutting to length of the strip material into partial pieces can be carried out, in which no edge remains. In the present disclosure, the term blanks shall refer to sheet metal blanks having any type of contour, for example, rectangular or shaped edges, as well as to sheet metal blanks combined from several partial blanks.

The step of forming the blanks can be carried out as hot forming according to a first embodiment. Hot forming refers to forming processes in which the work pieces are heated to a temperature in the range above the austenitisation temperature before the forming and in which at least partial areas are hardened during, respectively shortly after the forming process. The heating is carried out in a suitable heating device, for example a furnace. The hot forming can be carried out according to a first possibility as an indirect process, which comprises the partial steps cold pre-forming of the blank to a pre-formed component, then heating of at least partial areas of the cold preformed component to an austenitisation temperature, and subsequently hot forming the component for producing the final outline of the product. An austenitisation temperature is a temperature range in which at least a partial austenitisation (microstructure in the two phase area ferrite and austenite) is present. Furthermore, it is also possible to only austenitise partial areas of the blank, to enable, for example, a partial hardening. The hot forming can also be carried out according to a second possibility as a direct process, in which at least partial areas of the blank are directly heated to the austenitisation temperature and then hot formed and hardened to the required final outline in one step. A previous (cold) forming does not take place. Also during the direct process, a partial hardening can be achieved by austenitizing partial areas. For both processes a hardening of partial areas of the component is also possible by differently tempered tool portions, or by using several tool materials, which enable different cooling velocities. In the latter case, the whole blank or the whole component can be completely austenitized.

According to an alternative process, the sheet metal blanks can also be cold formed. Cold forming are forming processes in which the blanks are not heated before forming, cold forming takes place at room temperature. Cold forming is especially used as a process for forming soft car body steels. After the cold forming the formed parts can optionally be hardened.

During or after the forming, a heat treatment can be provided as integrated or separate method step, with which portions of different ductility can be produced in the work piece. Ductility means the formability of the steel material without damage or crack formation. The ductility can for example be evaluated by means of the elongation at fracture or contraction at fracture in tensile tests. An increased ductility in partial areas leads to a reduced edge cracking susceptibility and increased weldability of the material in said partial areas.

After the hardening the formed part is cleaned. According to a preferred embodiment, the step of cleaning is carried out such that an increase of diffusible hydrogen concerned with the cleaning, measured directly before and after the cleaning, is less than 0.7 ppm (parts per million). Directly before and after the cleaning can comprise a time frame of respectively up to 10 minutes before or after, within which the content of diffusible hydrogen is measured in the material. In this manner, unwanted hydrogen embrittlements of the steel material can be prevented or at least reduced.

According to a first process, the cleaning of the formed part can be carried out mechanically. This means any treatment, in which unwanted contaminations, which are present after the forming, are mechanically removed from the surface. The advantage of the mechanical cleaning is that no unwanted hydrogen is introduced into the work piece. Preferably, the formed part can be blasted or brushed. As methods for blasting, especially shot-blasting, blasting with corundum or with dry ice ($CO_2$) can be used. By shot blasting, a rougher surface is produced than in the non-blasted condition, which has advantageous effects on the adhesion properties of a later applied coating. According to an alternative process, the cleaning can also be carried out by anodic etching. The anodic etching can be carried out by dipping the formed parts into an immersion bath, wherein the removal of scales and other contaminations is carried out under the influence of a direct current.

It is to be understood that additional to the above named method steps, further steps can be used beforehand, during, or afterwards. For example, before or after the flexible rolling, a heat treatment of the strip material can be carried out. After the flexible rolling, a strip straightening can be provided. Furthermore, before the coating process, a pre-treatment, like purging and/or deoxidation (surface activation) of the work piece can be provided. After the coating process, further treatments like a purging-, passivation-, drying- and/or heat treatment can be carried out as a further treatment.

The method steps are preferably carried out such, that after the coating process, an amount of a maximum of 0.7 ppm of diffusible hydrogen are contained in the formed part. In this manner, unwanted hydrogen embrittlements of the steel material are prevented or at least reduced. During the cleaning, the hydrogen inclusion is kept especially low by means of anodic etching. During the coating process the use of the auxiliary elements contributes to a low hydrogen inclusion. An especially low hydrogen inclusion is achieved by combining the use of auxiliary elements and of an acidic electrolyte with relative flow.

Furthermore, a plant for manufacturing a hardened formed part comprises: a rolling device for rolling the hardenable strip material; a cutting device for producing a blank from the strip material; a heat treatment device for heating the blank to an austenitisation temperature; a forming- and hardening device for forming and hardening the blank to a hardened formed part; a cleaning device for cleaning the hardened formed part; a coating device for coating the hardened formed part with a metallic coating, wherein the coating device has a dipping bath with an electrolyte solution and at least one auxiliary element in the dipping bath, which is formed such that it partially influences the deposition of the coating on the hardened formed part.

With the plant the same advantages are achieved, as with the above named method, so that for preventing repetitions it is referred to the above description. With the plant, the method can be carried out, and vice versa. It is to be understood that each individual feature concerning the method is also valid for the plant and, vice versa, each feature concerning the plant is also valid for the method. The individual devices like rolling device, cutting device, heat treatment device, forming device and cleaning device, which form together the plant can be arranged spatially close to each other, which keeps the handling- and transportation expenditure of the work piece correspondingly low, or can also be arranged in spatially separated places.

According to a preferred embodiment, the at least one auxiliary element is formed as an auxiliary anode, which can be configured to be inert and/or non-soluble and/or dimensionally stable. A dimensionally stable anode is not dissolved during the coating process and is preferably adapted to the shape of the to be coated component.

Preferably, the coating device has a holding mechanism, on which the at least one auxiliary element is attached, wherein the holding mechanism is movable in the dipping bath relative to the hardened formed part. The holding mechanism is configured to carry at least one auxiliary element and can also be referred to as holding device. When using several auxiliary elements, also several holding mechanisms can be provided according to a first possibility. Alternatively, also several auxiliary elements can be accommodated in one holding mechanism. The function of the holding mechanism is preferably such that herein one or more of the auxiliary elements are accommodated. After dipping the to be coated component into the dipping bath, the holding mechanism is advanced with at least one auxiliary element accommodated therein to the component, wherein the at least one auxiliary element is brought into the required position neighbouring the formed part. In this position the one or more auxiliary elements influence the coating structure in the required manner.

At least one of the auxiliary elements can have one or more through openings, through which the electrolyte can flow in a targeted manner onto a partial area of the formed part. In this manner, an increased deposition of the coating is achieved locally onto the formed part. In total one or more of the auxiliary elements are arranged preferably enclosing the formed part such that a directed circulation around the component by the electrolyte is possible.

According to a preferred embodiment, the coating device has a flow mechanism, which produces a relative flow between the electrolyte solution and the hardened formed part. The flow inhibits the formation of hydrogen and prevents such danger of hydrogen embrittlement of the formed part. The produced relative flow velocity between the work piece and the electrolyte can, for example, be between 10 mm/sec and 600 mm/sec. According to a first possibility, the flow mechanism or device can be configured such that the formed parts are moved by through the stationary dipping bath. Alternatively or additionally, the flow device can have one or more pumps, which move the electrolyte solution in a flow relative to the work piece. Preferably, the electrolyte solution is made to flow onto the formed parts by nozzles, which nozzles can be arranged under an angle of preferably 90° up to ±45° relative to the work piece surface. Generally, in electrolyte solutions an inhomogeneous distribution of the current density can be present on the work piece surface. Thus, the flow of the electrolyte solution relative to the work piece is preferably adjusted such that a homogenous distribution of the current density is produced on the work piece surface. The above named auxiliary elements serve for compensating an uneven current density, for which they are arranged on the formed part such that in total a coating with at least as far as possible constant layer thickness is produced. The current density for the coating process can be between 2 and 70 $A/dm^2$.

Further included in the present subject matter is a product, especially a structural component for a motor vehicle, which is manufactured according to the method or the plant discussed above.

In the following, preferred embodiments are described using the drawings, which are as follows.

Figure 1:
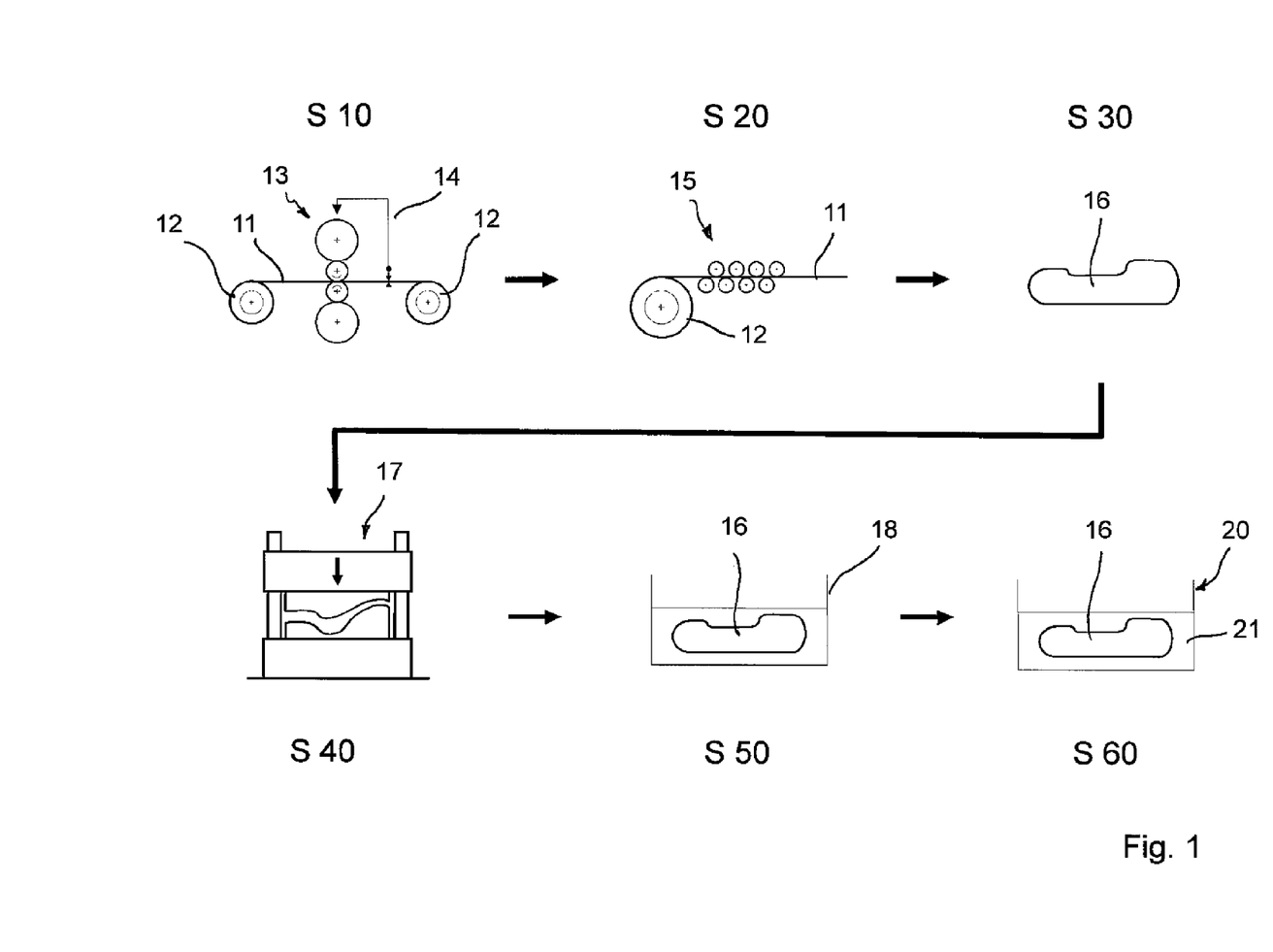
FIG. 1 is a flowchart illustrating an exemplary method for manufacturing a product from a flexible rolled strip material.

FIG. 1 shows schematically an exemplary method for producing a product from a strip material. In method step S10, the strip material 11, which is wound onto a coil 12 in starting condition, is worked in a rolling manner, in particular by flexible rolling. The strip material 11, which has a more or less constant sheet thickness along the length before the flexible rolling, is rolled by rolls 13 such that it receives a variable sheet thickness along the rolling direction. During the rolling, the process is monitored and controlled by a rolling gap control, wherein the data determined by a sheet thickness measuring device are used as input signal(s) for controlling the rolls. After the flexible rolling, the strip material 11 has different thicknesses in a rolling direction. The strip material 11 is again wound to a coil 12 after the flexible rolling, so that it can be transferred to the next method step. It is understood however that instead of described flexible rolling also a rolling process can be used wherein the strip material is rolled to a constant sheet thickness.

A hardenable steel material, like for example 22MnB5, 34MnB5 or 51 CrV4, can be used as material for the strip material 11. The starting material has preferably a tensile strength of at least 450 MPa (megapascals) and at a maximum 850 MPa.

After the flexible rolling, the strip material can be smoothed out in a strip straightening device 15. The method step S20 of smoothing is optional and can also be omitted.

After the flexible rolling (S10), respectively smoothing (S20), individual sheet blanks 16 are worked from the strip material 11 in the next method step S30. The working out of the sheet blanks 16 from the strip material is preferably carried out by punching or cutting. Depending on the shape of the sheet metal blank to be produced, this can be punched from the strip material 11 as a contoured blank, wherein an edge remains on the strip material, which is not further used, or the strip material can be cut simply into partial pieces.

After producing the blanks from the strip material, a forming and hardening of the workpieces is carried out in the next method step S40 to the required formed part.

The forming and hardening can be carried out as a direct or indirect process. In a direct process, the blanks are heated to an austenitizing temperature before the forming, which for example can be carried out by induction heating or in a furnace. The austenitizing temperature refers to a temperature range, in which at least a partial austenitisation (mircostructure in the two phase range ferrite and austenite) is present. However, also only partial areas of the blank can be austenitized, to enable for example a partial hardening.

After heating the blank to the austenitizing temperature, the heated blank 16 is formed and cooled with a high cooling velocity in a forming tool 17, wherein the component receives its final shape and is hardened at the same time. This process, which is also designated as hot forming, is represented as method step S40. A special type of the hot forming is the press hardening, which is carried out with high pressures.

In an indirect hot forming process, the blank 16 is subjected to a pre-forming before the austenitisation. The pre-forming is carried out in the cold condition of the blank, i.e., without previous heating. During the pre-forming, the component receives a profile, which corresponds not yet to the final shape, however it is approximated thereto. After the pre-forming, an austenitisation and hot forming takes place, as in the direct process, wherein the component receives its final contour and is hardened.

During the forming process, areas with different ductility and/or areas with different strength can be produced in the workpiece.

The steel material should, as far as a hot forming (direct or indirect) is provided, have a proportion of carbon of at least 0.1 mass percent up to 0.35 mass percent. Independent of the type of hot forming, the complete workpiece or only partial areas can be hardened. When carrying out the hot forming such, that only partial areas are hardened, the formed part has areas with reduced strength and increased elongation at break. By applying a coating only in these soft zones in a subsequent method step, the danger of hydrogen embrittlement in the hardened areas is reduced.

After the forming and hardening (method step S40), the formed part 16 is subjected to a cleaning process in method step S50. The cleaning of the formed part is carried out such, that an amount of a maximum of 0.7 ppm of diffusible hydrogen (H) is introduced into the formed part. An anodical acid cleaning is provided. During the anodical acid cleaning, the formed part 16 is dipped into a dipping bath 19, where a removal of scales and other contaminations is carried out under the influence of an electrical current. Alternatively, also a mechanical cleaning process can be used, like shot blasting or brushing.

The formed parts 16 are provided with a corrosion protection in the method step S60 after the cleaning. The formed parts run through an electrolytic coating plant 20, which can comprise several stations. Preferably, a coating material with a proportion of at least 50 mass percent of zinc, especially at least 90 mass percent of zinc, is used for the coating process, wherein also a pure zinc coating is possible. The coating material can also contain further alloying elements.

After the coating, the formed parts 16 can optionally be subjected to a purging, i. e. cleaning (not shown). After the purging, the formed parts 16 can be heat treated (not shown), wherein a heat treatment can also be omitted, when the content of diffusible hydrogen is below the allowable maximum level. The heat treatment can in principle be carried out in any suitable technical manner, for example in batch annealing or also by inductive heating, to name only two methods exemplarily. The heat treatment can be carried out at a temperature of more than 220° C., preferably more than 230° C. The highest temperature for the heat treatment is preferably lower than the AC1-temperature of the steel material, e.g., at the most 600° C., preferably at the most 400° C. By means of the heat treatment, which can also be designated as effusion annealing, residual stresses in the working piece or stress peaks in the hardened component are reduced, and/or the elongation at fracture is increased. At the same time, by means of the selected temperature, the hydrogen effusion is accelerated, so that in total a lower hydrogen embrittlement is achieved. The heat treatment can be carried out in a time frame of few seconds up to three hours. Carrying out the heat treatment after the coating accelerates the drying of the components, and by tempering the material characteristics are improved concerning ductility and elongation at fracture when using high-strength steels.

Followingly, the coating process is described separately using FIGS. 2 to 5.

The coating is carried out galvanically by an electrolyte solution 21, into which the formed parts 16 are dipped. A corresponding coating device 20 in a first embodiment is shown schematically in FIGS. 2A and 2B. A formed part 16 is visible, which is dipped into an immersion bath with an electrolyte solution 21. The formed part 16 can be moved in the immersion bath so that a relative flow is generated between the formed part 16 and the electrolyte. In this manner a uniform layer structure is achieved and the production of hydrogen is reduced. In the immersion bath, anodes (not shown) are provided, that can be made from the coating material and metal ions to the electrolyte when applied with an electric current, or anodes from non-soluble material, wherein in this case the coating material is already contained in the electrolyte. The metal ions are deposited as atoms on the formed part 16 and form the coating, with the formed part acting as a cathode. The formed parts 16 can, for example, be structure components of the car body of a motor vehicle, such as A-, B- or C-pillars or other car body parts.

Figure 2A:
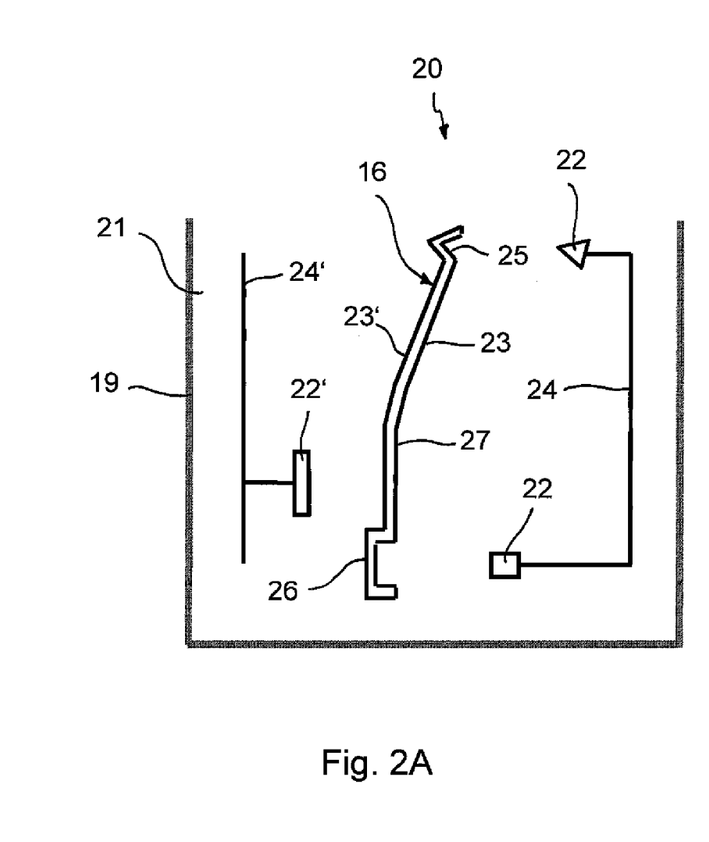
FIG. 2A illustrates an exemplary device for coating a product in a first embodiment in a first position (resting position).
Figure 2B:
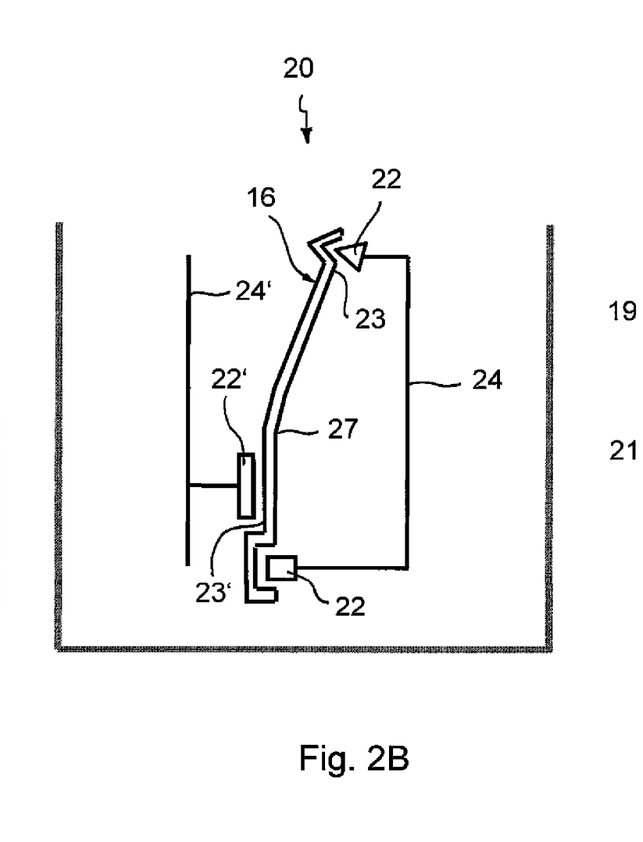
FIG. 2B illustrates an exemplary device for coating a product in the first embodiment in a second position (operating position).

A feature of the present coating method is that several auxiliary elements 22, 22' are used in the immersion bath, which elements 22, 22' partially influence the deposition of the coating. In the present case two groups of auxiliary elements are provided, namely first auxiliary elements 22 for a first side 23 of the formed part 16 and a second auxiliary element 22' for the second side 23' of the formed part. The two first auxiliary elements 22 are attached to a joint first carrier 24, which is arranged in the electrolyte 21 and is movable relative to the immersion bath 19 and/or the formed part 16. A second auxiliary element 22' is mounted on a second carrier 24', which is arranged in the electrolyte 21 and is movable relative to the immersion bath 19 and/or to the formed part 16 The carriers 24, 24' are also designated as a holding mechanism or device.

In FIG. 2A it can be seen that the carriers 24, 24', and the auxiliary elements 22, 22' connected thereto, are arranged at a distance to the formed part. After dipping the formed part 16 into the dipping bath 19, the carriers 24, 24' with the auxiliary elements 22, 22', attached thereto, are moved from the resting position (FIG. 2A) towards the formed part 16 into the working position (FIG. 2B), to locally influence the coating process. By the movability of the respective auxiliary element 22, 22' relative to the formed part 16, the auxiliary element can be exactly positioned for the coating process and thus, the deposition of the coating, respectively the layer structure can be locally influenced, for example promoted or inhibited.

At least one or some of the auxiliary elements 22, 22' can include an electrically conductive material so as to be electrically conductive, which is subjected to an electric potential during the coating process. If more than one auxiliary element are used, the auxiliary elements 22, 22' can be applied with different electric potentials during the coating process. Thus, the layer thickness, to be produced on the formed part 16, can be individually adjusted. According to an embodiment, the coating process can be carried out such that, in a first step, the electrolyte solution is subjected to a pulsed current and then in a following second step to an non-pulsed current. By the pulsed current feed a nanocrystalline layer structure is achieved, so that the coating has an especially fine grain size close to the working piece. The application of electric current can be carried out via separate anodes (not shown) and/or via the electrically conductive auxiliary elements 22, 22'.

It is also possible that one or more auxiliary elements 22, 22' include a non-conductive material so as to be electrically non-conductive. For the coating process, such a non-conductive auxiliary element 22, 22' is arranged in particular such that in the immersion bath the deposition of a coating is partially inhibited. It is to be understood that one or more electrically conductive auxiliary elements can be used in combination with one or more non-conductive auxiliary elements.

Figure 3A:
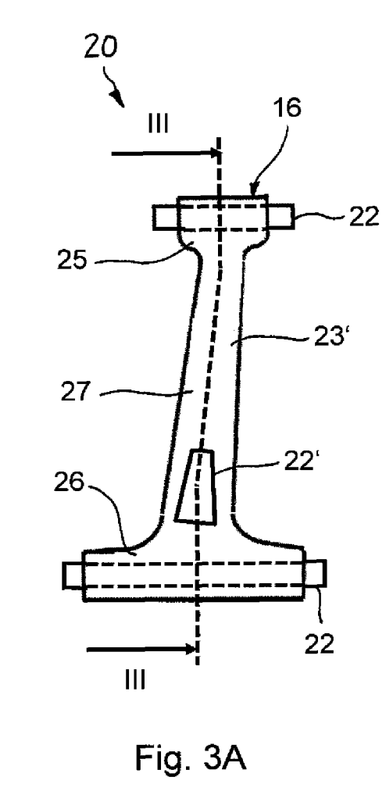
FIG. 3A illustrates the product of FIG. 2 with further details of the coating device in a first view.
Figure 3B:
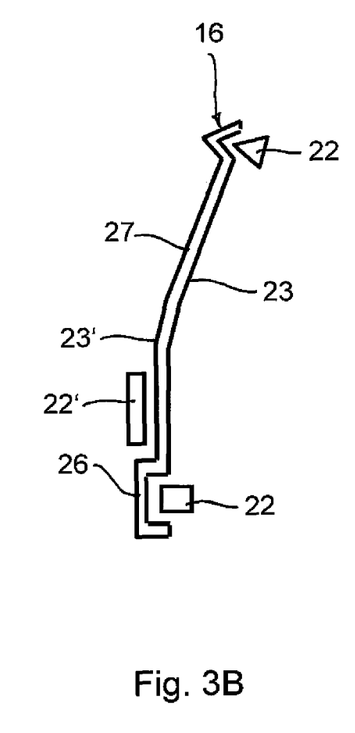
FIG. 3B illustrates the product of FIGS. 2A-2B in a cross-sectional view according to section line III-III of FIG. 3A).
Figure 3C:
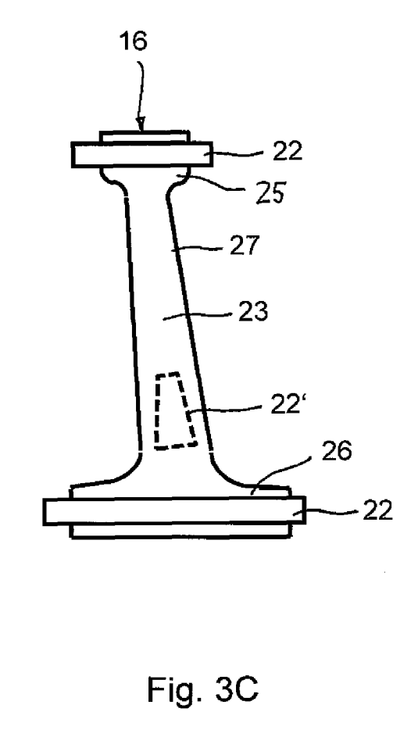
FIG. 3C illustrates the product of FIGS. 2A-2B in a second view.

In FIGS. 3A to 3C further details of an exemplary formed part 16 with auxiliary elements 22, 22' are shown. The auxiliary elements 22 extend transversally to an upper and lower portion 24, 25 of the formed part 16, which presently is provided in the form of a B-pillar for a motor vehicle. It is visible, that the upper auxiliary element 22 has an approximately triangular cross-section and is adapted to a corresponding contour of the upper portion 24 of the formed part 16. The lower auxiliary element 22 has an approximately rectangular cross-section and is adapted to the U-shaped contour of the lower portion 25 of the formed part 16. On the opposed side 23' the auxiliary element 22' is provided in a lower part of the intermediate portion 26, which, when seen in a side view, is arranged within the outer contour of the formed part 16.

Figure 4A:
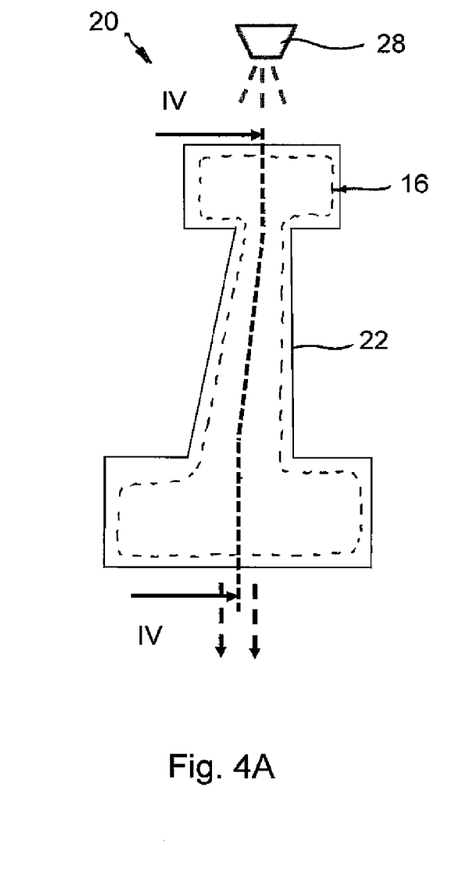
FIG. 4A illustrates an exemplary device for coating a product in a further embodiment in a first view.
Figure 4B:
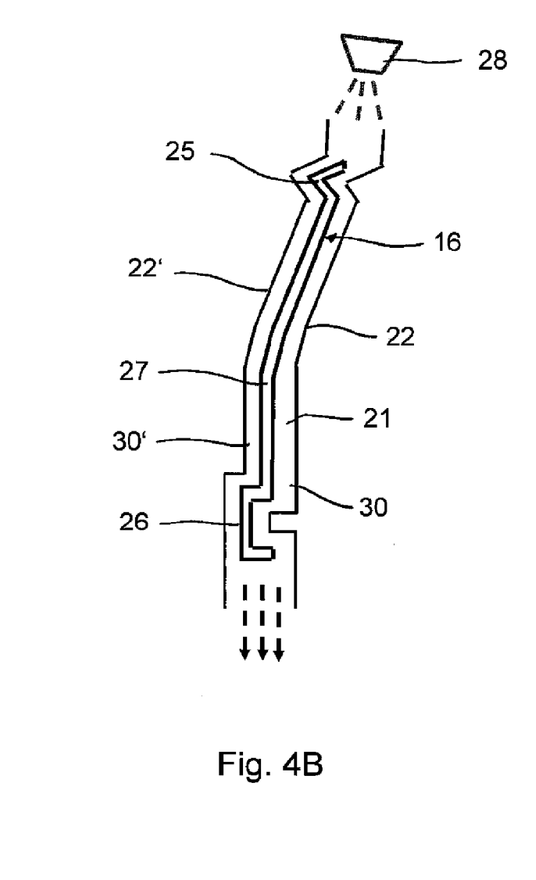
FIG. 4B illustrates the device of FIG. 4A in a cross-sectional view according to section line IV-IV of FIG. 4A).

FIGS. 4A and 4B show a coating device 20 in a further embodiment. This corresponds more or less to the embodiment of FIGS. 2 and 3, so that it is therefore referred to the above description. The immersion bath and the carrier are not shown for the sake of simplicity. The same or corresponding components are provided with the same reference numerals as in the above Figures.

A special feature of the present embodiment of FIGS. 4A and 4B is that the auxiliary elements 22, 22' extend across the whole surface of the formed part 16. The formed part 16 is arranged between the two auxiliary elements 22, 22', wherein the two auxiliary elements form a channel 30, 30', through which the electrolyte solution is pumped by means of one or more nozzles 28. In this manner, a flow well enclosing the working piece, and thus, a relative quick layer build-up is achieved. Furthermore, the electrolyte flow counteracts the formation and the introduction of hydrogen into the workpiece. In the cross-section view of FIG. 4B it can be seen that the shape of the auxiliary elements 22, 22' is adapted to the outline of the formed part 16. A respective gap with approximately constant width along the formed part 16 is formed between the surface 23, 23' of the formed part 16 and the corresponding auxiliary element 22, 22'. In the present example, the electrolyte flows in on the upper portion 24 and exits at the lower portion 25, which is indicated by the arrows. It is to be understood that the auxiliary elements could also have a different shape, especially such that the gap is partially reduced and/or enlarged, to influence the flow in a selective manner in these areas.

Figure 5A:
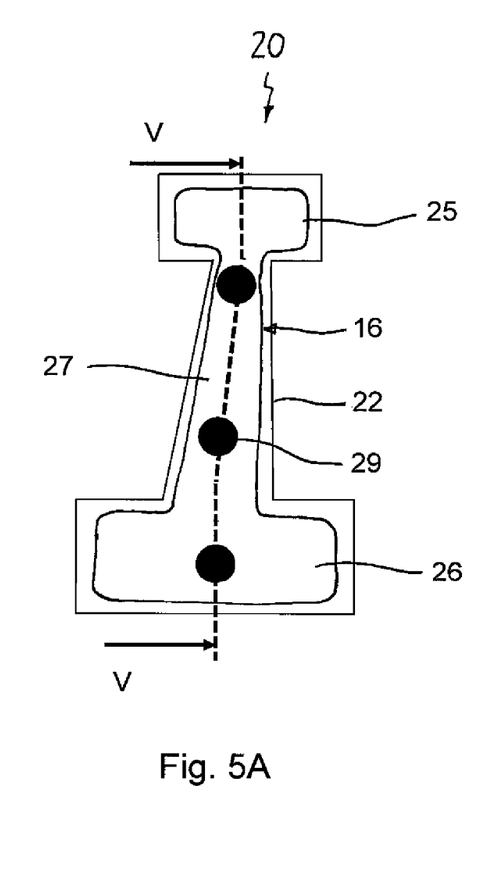
FIG. 5A illustrates an exemplary device for coating a product in a further embodiment in a first view.
Figure 5B:
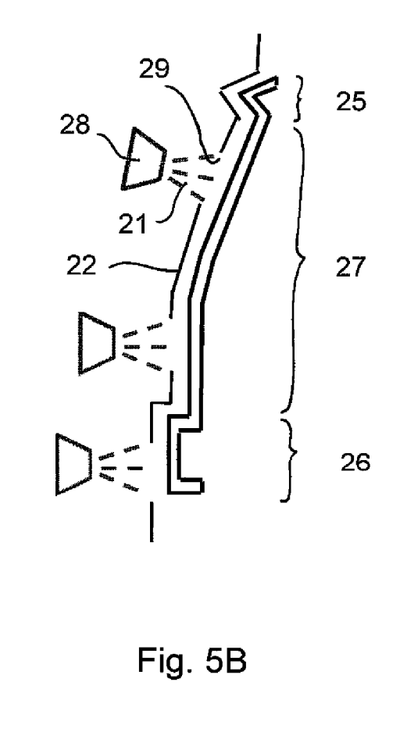
FIG. 5B illustrates the device of FIG. 5A in a cross-sectional view according to section line V-V of FIG. 5A).

FIGS. 5A and 5B show a coating device 20 in a further embodiment. This largely corresponds to the embodiment of FIGS. 2 to 4, so that correspondingly it is referred to the above description. The immersion bath and the carriers are not shown for simplicity. The same or corresponding components are provided with the same reference numerals as in the above Figures.

A special feature of the present embodiment of FIGS. 5A and 5B is that the auxiliary element 22 extends across the total surface of the formed part 16. Within the auxiliary element 22, several through openings 29 are distributed across the extension of the formed part 16, through which the electrolyte solution is streamed by means of nozzles 28 onto the formed part 16. In this manner, an increased partial coating deposition is achieved in these areas covered by the through openings. In the cross-sectional view of FIG. 5B it can be seen that the shape of the auxiliary element 22 is adapted to the contour of the formed part 16. A gap with approximately constant distance is formed along the formed part 16 respectively between the surface 23 of the formed part 16 and the respective auxiliary element 22. In the present example an auxiliary element 22 is arranged only on one side of the formed part, through which through openings 29 electrolyte solution is streamed onto the formed part 16. It is, however to be understood that also on the opposite side a further auxiliary element could be arranged and/or, that the gap could be formed with a variable width along the formed part.

In the present embodiments, a complete coating of the formed parts is always provided. However, it is possible that only partial areas of the formed part are coated. Thus, the processing effort as well a welding process following thereto for connecting the formed part to other components can be simplified. Furthermore, hydrogen can easily effuse into the non-coated areas, so that the risk of a hydrogen embrittlement is reduced. In this case it is especially advantageous, when the formed parts are provided with the corrosion protection coating only locally in the corrosion endangered areas. These are for example areas, which are exposed to increased moisture in motor vehicles and thus, can also be designated as wet areas.

The electrolytic coating is carried out after the flexible rolling, after the cutting of the blanks, and after the forming thereof. The coating applied on the formed parts is continuously closed and/or free of cracks and can be set to a uniform thickness, i.e., independent of the respective thickness of the work piece. Thus, also the stronger rolled areas have a sufficiently thick coating, which reliably protects against corrosion. By an upstream or downstream heat treatment, residual stresses can be reduced in the work piece and the hydrogen effusion can be accelerated, which also leads to a lower hydrogen embrittlement of the material.

It is to be understood, that the method disclosed herein can be modified. For example, also intermediate steps, here not separately shown, can be provided between the named steps. For example, the formed parts can be provided with an intermediate layer before the step of electrolytic coatings, especially a nickel-, aluminium- or manganese layer. This intermediate layer forms an additional protection of the surface and improves the adhesion of the later applied coating containing zinc.

The invention claimed is:

1. A method for manufacturing a hardened formed part, comprising:
   producing a blank from a hardenable strip material;
   heating the blank to an austenitisation temperature;
   forming and hardening the blank to a hardened formed part;
   cleaning the hardened formed part; and
   coating the hardened formed part with a metallic coating in a dipping bath with an electrolytic solution, wherein during coating at least one auxiliary element is provided in the dipping bath and positioned relative to the hardened formed part, such that a deposition of the coating on the hardened formed part is locally influenced by the at least one auxiliary element.

2. The method of claim 1, wherein the step of coating is carried out such that an average coating thickness of at least 3 µm (micrometers), and at a maximum of 30 µm, is applied to the hardened formed part.

3. The method of claim 1, wherein the at least one of the auxiliary element is electrically conductive and is subjected to an electric current during the step of coating.

4. The method of claim 1, wherein several auxiliary elements made from an electrically conductive material are provided, the elements being subjected to different electric currents during the step of coating.

5. The method of claim 1, wherein the step of coating is carried out such that the electrolyte solution is subjected to a pulsed current.

6. The method of claim 1, wherein the at least one of the auxiliary element is electrically non-conductive and is arranged in the immersion bath during the coating such that the deposition of coating is partially inhibited.

7. The method of claim 1, wherein the at least one of the auxiliary element is accommodated in a holding device, further wherein the holding device is movable in the immersion bath.

8. The method of claim 1, further comprising moving the auxiliary element after dipping the hardened formed part into the dipping bath from a resting position, in which the auxiliary element is distanced from the hardened formed part, into a treatment position, in which the auxiliary element approximated to the hardened formed part.

9. The method of claim 1, wherein during the step of coating a relative flow is generated between the hardened formed part and the electrolyte solution.

10. The method of claim 1, wherein the step of coating is carried out with a coating material that has a mass portion of zinc of at least 50%.

11. The method of claim 1, wherein the hardened formed part is coated for a maximum of 20 minutes.

12. The method of claim 1, wherein the blank is produced such that portions with different thicknesses are formed by at least one of flexible rolling of the strip material and subsequently cutting the blank from the flexible rolled strip material, and connecting a first partial blank with a first thickness and a second partial blank with a second thickness deviating from the first thickness.

13. The method of claim 1, wherein, after the step of coating, a maximum amount of 0.7 ppm of diffusible hydrogen is contained in the hardened formed part.

14. The method of claim 1, wherein the step of cleaning of the hardened formed part is carried out by at least one of anodic etching, blasting and brushing.

* * * * *